United States Patent

Nakao

Patent Number: 5,129,278
Date of Patent: Jul. 14, 1992

[54] TRANSMISSION OPERATING DEVICE

[75] Inventor: Makoto Nakao, Sanda, Japan

[73] Assignee: Nippon Cable System Inc., Takarazuka, Japan

[21] Appl. No.: 691,294

[22] Filed: Apr. 25, 1991

[30] Foreign Application Priority Data

May 2, 1990 [JP] Japan .................. 2-116029

[51] Int. Cl.$^5$ ............................................. G05G 9/16
[52] U.S. Cl. .................. 74/473 R; 74/501.6; 74/471 XY
[58] Field of Search .......... 74/471 XY, 471 R, 473 R, 74/475, 501.5, 501.6

[56] References Cited

U.S. PATENT DOCUMENTS

| | | | |
|---|---|---|---|
| 3,172,301 | 3/1965 | Hurst, Jr. et al. | 74/473 R |
| 3,795,157 | 3/1974 | Campbell et al. | 74/473. R X |
| 4,483,211 | 11/1984 | Hurlow | 74/501.6 X |
| 4,583,417 | 4/1986 | Hurlow | 74/501.6 X |
| 4,630,500 | 12/1986 | Suzuki | 74/473 R |
| 4,631,975 | 12/1986 | Suzuki | 74/473 R |
| 4,671,131 | 6/1987 | Hurlow | 74/473 R X |
| 4,916,964 | 4/1990 | Crack | 74/473 R X |

FOREIGN PATENT DOCUMENTS 59-56120 4/1984 Japan .
63-28010 7/1988 Japan .

Primary Examiner—Leslie A. Braun
Assistant Examiner—Winnie Yip
Attorney, Agent, or Firm—Armstrong & Kubovcik

[57] ABSTRACT

A transmission operating device comprises a frame, a selecting operational member and a shifting operational member which are provided on a frame so as to extend in the fore-and-back direction of the frame, and are arranged substantially parallel to each other, a selecting shaft supported on the back side of the frame so as to rotate around a first axis crossing obliquely with a plane perpendicular to an axis extending in the fore-and-back direction, the selecting shaft having a connecting member, which is a part thereof and is located in a plane crossing with the vertical axis, and a change lever extending vertically and being connected with the selecting shaft so as to be rotatable around a second axis crossing with the first axis and extending in right and left direction of the frame. The selecting operational member has a free end connected with the connecting member and the shifting operational member has a free end rotatably connected with the above-mentioned change lever.

7 Claims, 7 Drawing Sheets

TRANSMISSION OPERATING DEVICE

BACKGROUND OF THE INVENTION

The present invention relates to a transmission operating device, and more particularly, to a device for operating transmission that a push-pull control cable (hereinafter referred to as a cable) is employed as means for transmitting operational forces.

Nowadays, a cable-type device for operating transmission (hereinafter referred to as a device) has been employed as a means for remotely operating a transmission of a front-wheel-drive small automobile having a front engine, a rear-wheel-drive bus or truck having a front engine, a rear-wheel-drive bus or truck having a rear engine, and the like. There are advantages in the device that it is light and low-cost, and that position of installing the devide can be relatively freely selected.

In the device, as shown in FIG. 7, rods 51, 52 connected with two cables (not shown) are arranged such that the rods are paralleled each other. Moreover, the rods 51, 52 are respectively operated by a single change lever 53 respectively.

That is to say, selecting operation of a transmission is performed by pushing/pulling the rod 51 for selecting in the longitudinal direction. The pushing/pulling operation is performed by inclining a change lever 53 in the right and left directions (in the direction of arrow P or arrow Q). And moreover, shifting operation of the transmission is performed by pushing/pulling the rod 52 for shifting in the fore and back directions. The pushing-/pulling operation is performed by inclining the change lever 53 in the fore and back direction (in the direction of arrow R or arrow S).

In the device shown in FIG. 7, the change lever 53 is connected with a frame via a ball joint 54. Furthermore, a pair of rods 51, 52 are slidably guided by means of guide pipes 55, 56, each of which has a base portion rotatably connected with a cable cap (not shown in the drawing) fixed to the frame (not shown in the drawing). A control cable for shifting is connected with the change lever 53 via one of rods 52, and a control cable for selecting is connected with a first arm 58 of a bell crank 57 via another rod 51.

The bell crank 57 is rotatably connected with the frame, and a second arm 59 of the bell crank 57 is connected with a shaft 61 so that the bell crank 57 can be rotated and can be allowed to move in the axial direction without moving the shaft 61. The shaft 61 is connected with a ball member 60 of a ball joint 54 of the change lever 53.

Generally, in case that two control cables arranged parallel to each other are pushed or pulled by inclining a change lever, extending in the direction perpendicular to the control cables, in the directions of fore, back, right or left, the following problem arises. That is to say, the control cable cam be directly pushed or pulled when the change lever is operated in the direction of extending of the control cable, i.e. in the fore or back direction (in the direction of arrow R or arrow S in FIG. 7). However, when the change lever is operated in the right or left direction, the direction of operational force must be changed by means of a mechanism for changing direction, such as the bell crank 57 or the like. Accordingly a construction becomes complicated and large, moreover, higher working accuracy and materials having smaller coefficient of friction are required in order to reduce a resistance of sliding. Therefore, production cost rises higher.

An object of the present invention is to resolve the above described problems, and to provide a transmission operating device that a construction is very simple, a loss of transmitting force is small, and moreover, production cost is low.

SUMMARY OF THE INVENTION

According to the present invention, there is provided a transmission operating device comprising:
 (a) a frame;
 (b) a selecting operational member and a shifting operational member which are provided on a frame so as to extend in fore-and-back direction of the frame, and are arranged substantially parallel to each other;
 (c) a selecting shaft supported on a back side of the frame so as to be rotatable around a first axis crossing obliquely with a plane perpendicular to an axis extending in the fore-and-back direction; the selecting shaft having a connecting member, which is a part thereof, and is located in a plane crossing with the fore-and-back axis;
 (d) a change lever extending vertically and being connected with the selecting shaft so as to be rotatable around a second axis crossing with the above-mentioned first axis and extending in the right and the left direction of the frame;
 (e) the selecting operational member having a free end connected with the connecting member; and
 (f) the shifting operational member having a free end rotatably connected with the above-mentioned change lever.

The above-mentioned first axis can be in a position obtained by rotating the lateral axis of the frame around the vertical axis (i.e. rotating in the horizontal plane), or another position obtained by rotating the longitudinal axis of the frame around the lateral axis.

That is to say, in the present invention, the first axis is required to diagonally cross with a plane perpendicular to the longitudinal axis.

It is preferable that the above-mentioned connecting member is crossed with the first axis with substantially rectangular angle, and is located in a plane substantially perpendicular to the longitudinal axis.

The above-mentioned selecting operational member (and shifting operational member) preferably comprises a pipe having an end region connected to the fore end of the frame by means of a spherical coupling, and a rod inserted into the pipe. An end of the rod is connected to a control cable for selecting operation (the control cable for shifting operation).

Further, it is preferable that the above-mentioned first axis is crossed with the second axis with an inclination of 35 to 55 degrees. Especially 45 degrees are more preferable.

And besides, the expressions about directions concerning the frame mentioned in Claims, such as direction of fore and back, right and left, and the expressions of longitudinal axis (fore and back axis), lateral axis (right and left axis), vertical axis, and the like are simply used in order to describe relations of arrangement between elements. Therefore, the above-mentioned expression do not relate to each direction of an automobile. For instance, the fore and back direction of the frame can be accorded to the right and left direction of an automobile.

In the transmission operating device mentioned above, when the change lever is inclined in the right-and-left directions, a composite rotation having a rotation around the first axis and another rotation around the second axis is arised in the change lever. Therefore, the change lever can be inclined in the right-and-left directions. Following the operation of inclining the change lever, the shaft for selecting is rotated and then, the connecting member is rotated around the first axis. At the time, a component of the fore or back direction is effectively worked on the operational member for selecting, and then, a selecting operation is performed. And besides, a component of the right or left direction or the upward or downward direction does not have effect on the selecting operation.

Further, following the operation of inclining the change lever in the right or left direction, the shifting operational member also swings in the right or left direction. However, the component of the fore and back direction is not arised due to the rotation around the above-mentioned second axis of the change lever. Therefore, the effective operation in the above-mentioned direction is not performed, and after all, only the selecting operation is effectively performed.

Further, when an operator intends to incline the change lever in the fore or back direction, the change lever is rotated around the second axis, and the shifting operational member is pushed or pulled in the fore or back direction, then shifting operation is performed.

In the case, selecting shaft is not rotated around the first axis. Therefore, connecting member does not swing also. Accordinly the shifting operational member is not influenced by shifting operation.

In case that the shifting operation is performed after selecting operation, the second axis is inclined in the fore and back direction such that the second axis is shifted (or moved) from a plane crossing with the fore and back axis (longitudinal axis) perpendicularly. However, since the angle between the second axis and the plane is slight, the difference has no effect on shifting operation.

In the present invention, the device does not require any bell crank or the like as mentioned above, since motion in the right or left direction concerning the change lever is transformed into motion in the fore or back direction by means of the selecting shaft which is inclined to the control cable.

DETAILED DESCRIPTION

The device according to the present invention is explained below with reference to the drawings.

Figure 1:
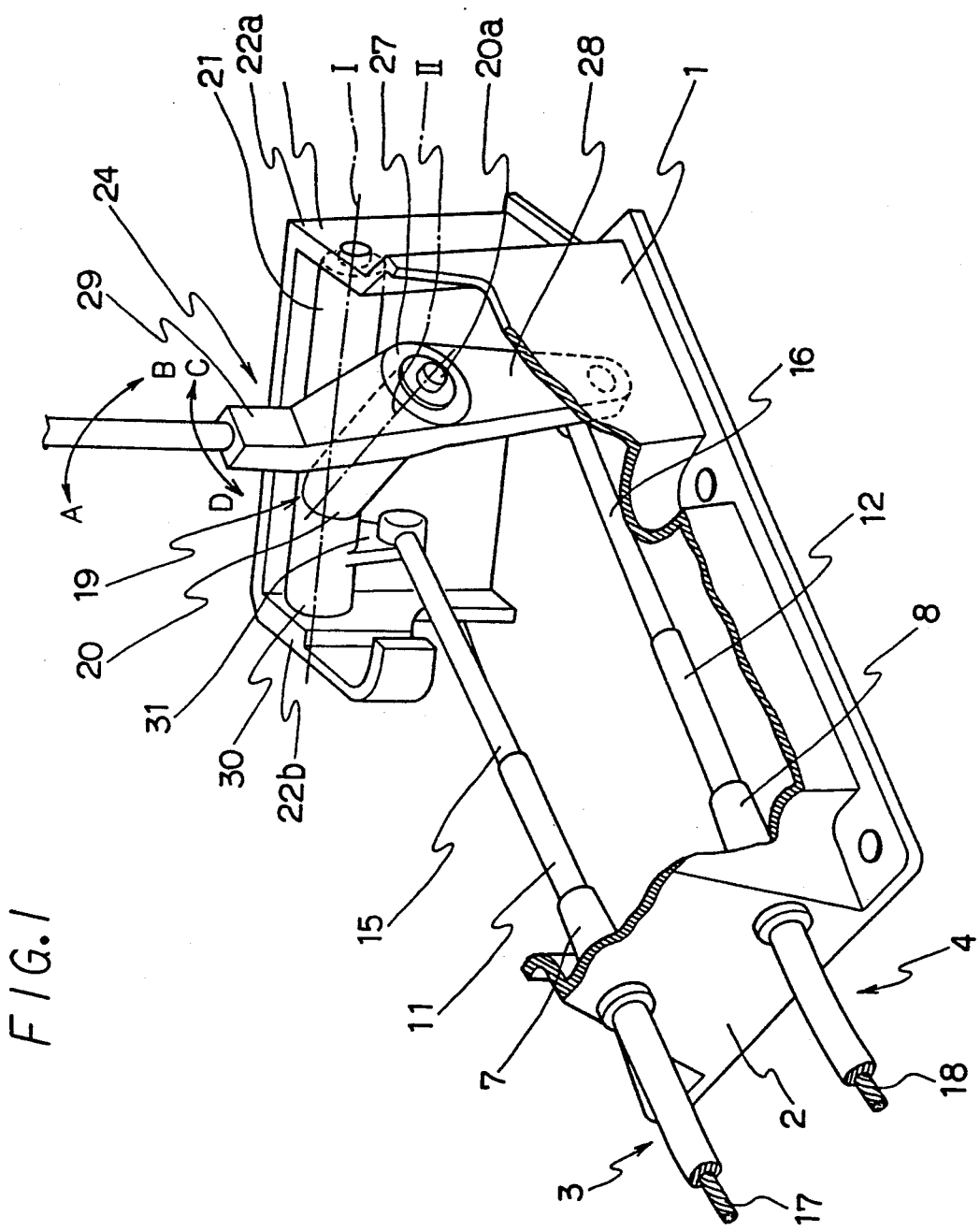
FIG. 1 is a perspective view showing an embodiment of the transmission operating device of the present invention.
Figure 2:
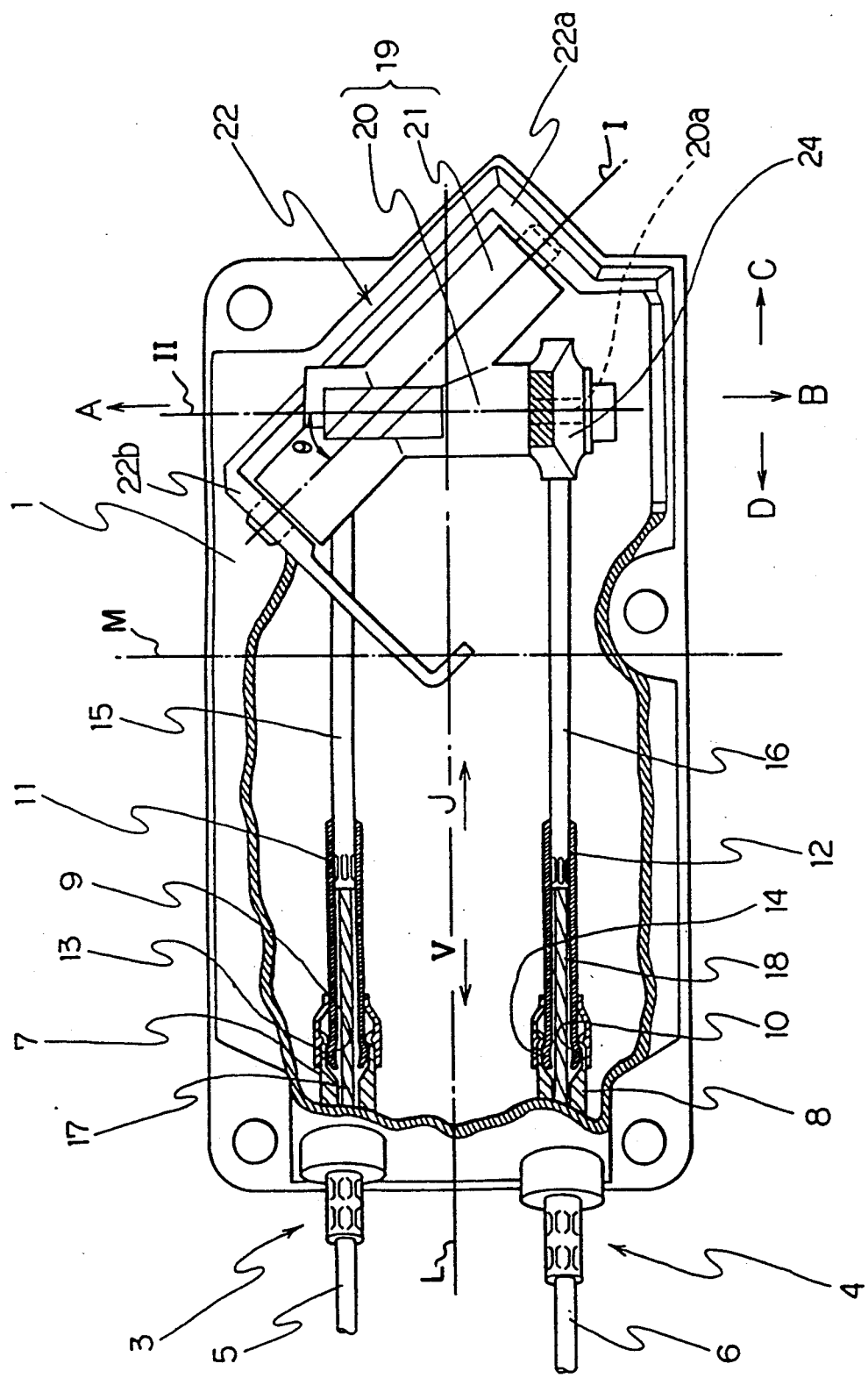
FIG. 2 is a partially cutaway front view of the device of FIG. 1.

In a transmission operating device shown in FIGS. 1 and 2, numeral 1 is a frame for installing which is tightly mounted on the "tunnel-like-shaped-case" or the like between a driver's seat and a navigator's seat.

The frame 1 has a wall member 2 at the fore side thereof. The wall member 2 is provided with a control cable for selecting operation 3 and a control cable for shifting operation 4. Each end of the control cables 3, 4 is arranged so as to extend approximately in the fore and back direction of the frame 1. The control cable for selecting 3 and the control cable for shifting 4 have conduits 5, 6 respectively. Further, the conduits 5, 6 are fixed on the above-mentioned wall member 2 by means of cable caps 7, 8 and the like. The cable cap 7, 8 has a socket portion 9, 10 at an end thereof. Each guide pipe 11, 12 is formed with a ball portion 13, 14 at an end thereof, and the ball portion 13, 14 is rotatably received in the socket portion 9, 10 like a ball joint. Each end region of rod 15, 16 is inserted into the guide pipe 11, 12 so that the rod 15, 16 is axially slidable and can be rotated around the axis thereof. Each end of the rod is fixed to an end of an inner cable (or inner core) of the above-mentioned control cable for selecting and the control cable for shifting so as to be in the same axis.

As used herein, a selecting operational member means the cable cap 7, the guide pipe 11 and the rod 15 as shown in the embodiment. An operational member for shifting means the cable cap 8, the guide pipe 12 and rod 16.

In the side of the frame 1 opposite to the above-mentioned wall member 2, a bracket 22 is provided so as to be inclined to the longitudinal axis of the frame having an angle of 45 degrees in the horizontal plane. The bracket 22 has a pair of plumb walls 22a, 22b which are opposed each other.

In the bracket 22, a shaft member 19 having a "y" like shape is housed, and both ends of the shaft member 19 are rotatably supported by means of the above-mentioned plumb walls 22a, 22b on the bracket 22. The rotational center of the shaft member 19 is hereinafter referred to as a first axis.

A body part of the shaft member 19 forms a selecting shaft 21, and a branch part of the shaft member 19 forms a shifting shaft 20. A base portion of the shifting shaft 20 is fixed to the selecting shaft 21 in nearly the center of the selecting shaft 21 with an inclination of 45 degrees. Further, the shifting shaft 20 is provided so as to be approximately perpendicular to the direction of arrangement of the control cables 3 and 4.

In the top end of the shifting shaft 20, a short axis 20a is fixed thereto, and the shifting shaft 20 is provided with the boss portion 27 of a change lever 24 so that the boss portion 27 can be rotated around the short axis 20a. Besides, the change lever 24 extends in the upward and downward direction. A rotational center of the change lever 24 is hereinafter referred to as a second axis.

The change lever 24 comprises the above-mentioned boss portion 27 for mounting on the shift shaft 20, an arm portion 28 extending downward from the boss portion 27 and a handle portion 29 extending upward from the boss portion 27. The handle portion 29 is slightly bent in the direction inward to the shaft member. That is to say, the handle portion 29 is bent so as to be one-sided to a point in which the first axis and the second axis are intersected, having a dogleg shape (or "L" like shape). However, a straight shape can also be employed as the handle portion 29.

The end portion of the above-mentioned rod 16 of the operational member for shifting is connected to a free end of the arm portion 28 by means of a ball joint or the like.

Moreover, in the neighborhood of a fore side end portion 30 of the selecting shaft 21 inclining in the fore-and-back direction is provided with a connecting member 31 which projects downwardly.

Further, the selecting rod 15 is swivelably connected with the end of the connecting member 31 via a ball joint or the like.

And besides, the position of the connecting member 31 is not limited to the neighborhood of the above-mentioned fore side end portion. Therefore, a suitable position can be selected so as not to be interfered with the shifting shaft 20 in consideration of a distance betwen two control cables 3, 4.

Next, an operation of the device constructed as mentioned above is explained.

Firstly, selecting operation in the direction of arrow A and arrow B (in the right and left directions) shown in FIGS. 1 and 2 is explained.

The important thing in the present invention is that the change lever can be inclined in the right and left directions in order to select due to a composite rotation of a rotation around the first axis I of the selecting shaft 21 and another rotation around the second axis II of the change lever 24, in spite of having no rotational axis extending in the longitudinal direction in which the control cable extends, and therefore, the rotation around the first axis I is transformed into movement in the fore and back direction of the connecting member-sas indicated by the arrows V and J in FIG. 2.

Figure 3A:
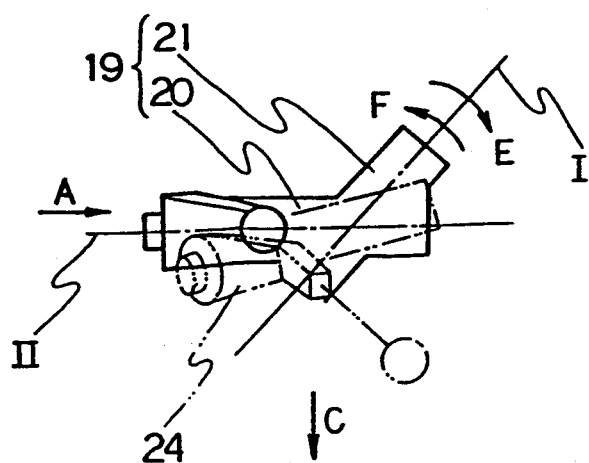
FIGS. 3a to 3c are respectively a plan view, a front view and a side view showing a component of rotating around the first axis of movement of the change lever during the selecting operation of the device of FIG. 1.
Figure 3B:
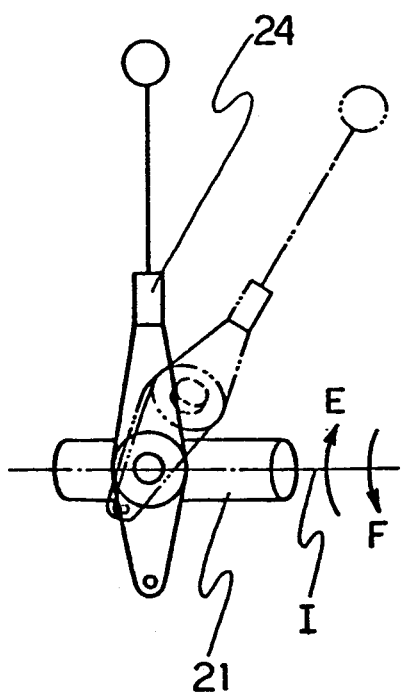

In order to show the above-mentioned function clearly, the rotation around the first axis (FIGS. 3a to 3ce and the rotation around the second axis (FIGS. 4a to 4c) are respectively explained hereinafter.

To begin with, the change lever 24 is assumed to be fixed to the shaft member. When the change lever 24 is intended to incline in the direction of arrow A from the neutral position (shown in a real line in FIG. 3a), the change lever 24 is rotated around the first axis I together with the shaft member 19 (as shown in a phantom line) in the direction of arrow E, i.e. the direction between the directions of arrow A and arrow C (or the composite direction of arrow A and arrow C).

Figure 3C:
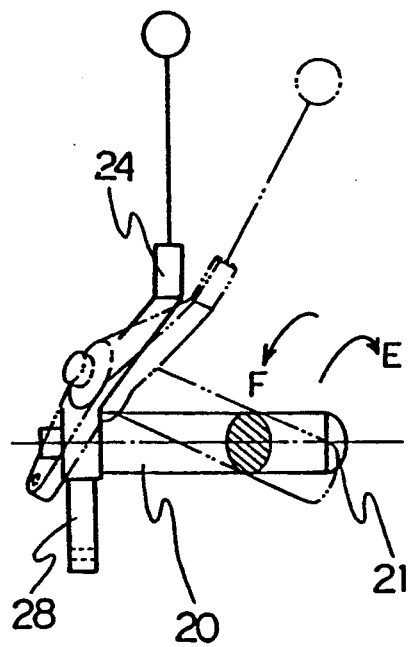

The connecting member 31 is also inclined in the direction of arrow E in FIG. 3c due to the rotation, then the pushing operation in the direction of extending of the control cable is transmitted to the selecting cable.

And besides, a component of the movement in the direction perpendicular to the control cable is absorbed by the rotation around the socket portion 9 of the rod 5 and the guide pipe 11.

Next, the shaft member 19 is assumed to be fixed. Under the situation, only the change lever is rotated around the second axis II in the direction of arrow H as shown in FIGS. 4a to 4c.

Figure 4A:
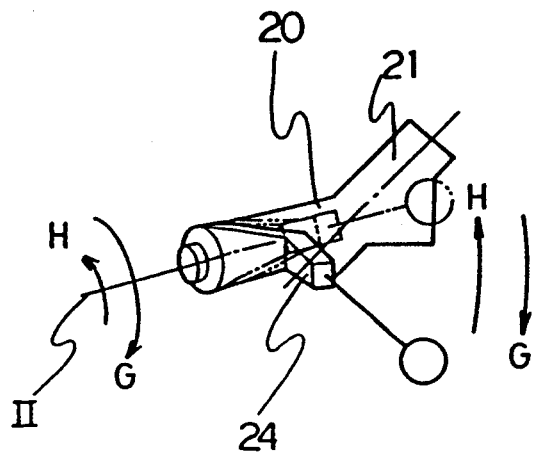
FIGS. 4a to 4c are respectively a plan view, a front view and a side view showing a component of rotating around the second axis of movement of the change lever during the selecting shaft of the device of FIG. 1.
Figure 4B:
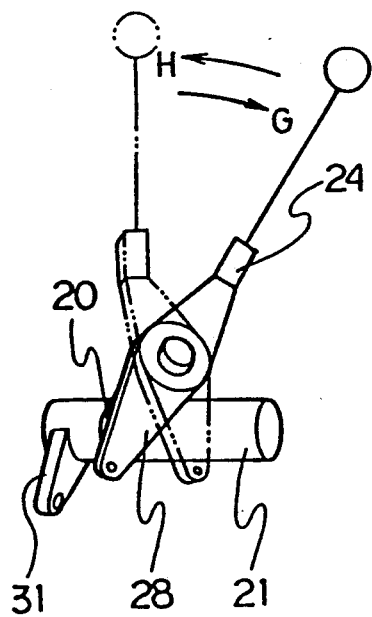
Figure 4C:
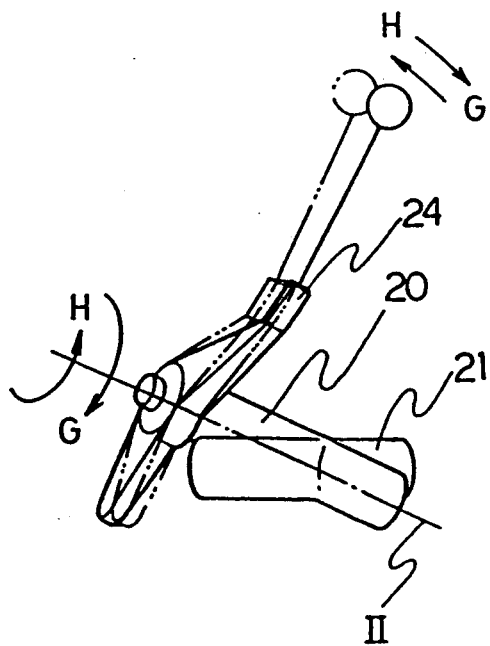

In the real state, the rotation in the direction of arrow E and the rotation in the direction of arrow H are composed, and the change lever 24 is rotated only in the direction of arrow A, seeing from the origical position as shown in chain double-dashed line of FIGS. 4a to 4c.

Therefore, though the shift cable 4 is pushed in the direction of arrow V in FIG. 2 due to the component around the first axis I, the shift cable 4 is, in the real state, moved merely laterally. After all, the shift cable 4 is not influenced by the direction extending of the control cable.

In a real situation, of course the above-mentioned rotation around the first axis I and the rotation around the second axis II arise at the same time, then the change lever 24 is merely inclined in the direction of arrow A.

For instance, if the change lever 24 is inclined in the direction of arrow A for 7 to 10 degrees, then the rotational angle around the first axis I is 10 to 14.5 degrees, and the rotational angle around the second axis II is 7 to 10 degrees.

In case that the change lever 24 is inclined in the direction of arrow B, a resultant operation which is inverse to the above-mentioned poeration for the arrow A is obtained. That is to say, the obtained operation has a composite rotation of the rotations in the directions of arrow F and G. Then the selecting calbe 3 is pulled in the direction of arrow J in FIG. 2.

Hereinafter, a shifting operation of inclining the change lever 24 in FIG. 1 in the direction of arrow C or arrow D is explained.

Figure 5:
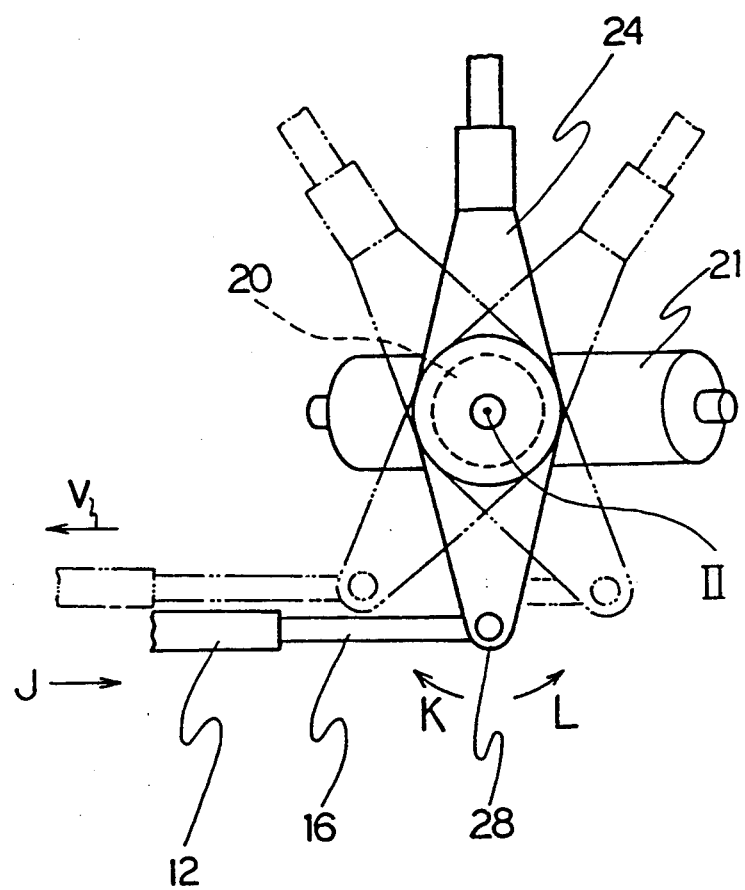
FIG. 5 is a schematic view showing the operating states of shifting operation.

When the change lever 24 is inclined in the direction of arrow C or arrow D from the neutral position, or from a position where the change lever 24 has been inclined in the direction of arrow A or the direction of arrow B, the change lever 24 is rotated around the shifting shaft 20 as shown in FIG. 5. The arm portion 28 provided on the change lever is simultaneously rotated int he direction of arrow K and arrow L, then a rod 16 and an inner cable 15 connected with the arm portion 28 are pushed or pulled in the direction of arrow v or arrow J. At the time, since the change lever 24 is merely rotated around the second axis II, the selecting shaft is not rotated thereby. Therefore, in the shifting operation, the selecting rod 15 and the selecting cable 3 are not pushed or pulled.

In the device shown in FIGS. 1 and 2, the first axis I and the second axis II cross each other at an angle $\theta$. In the case of FIG. 2, the angle $\theta$ is 45 degrees. And beside, generally, a crossing angle can be selected int he angles of 35 to 55 degrees.

Figure 6:
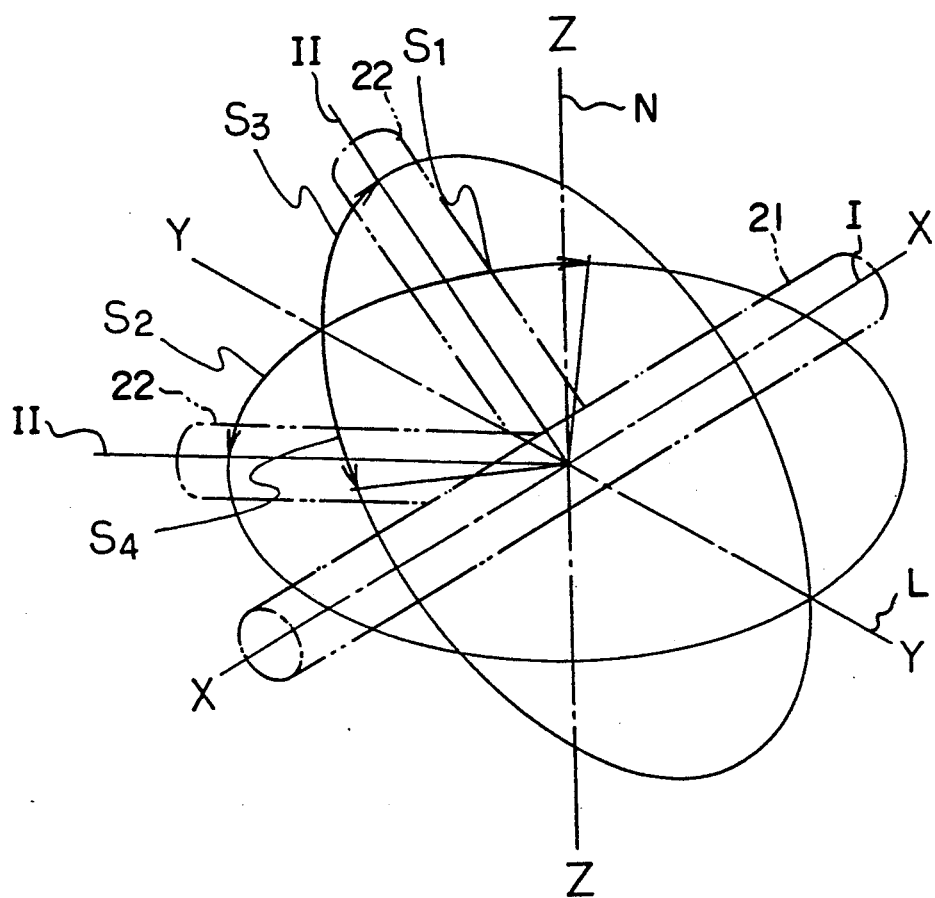
FIG. 6 is a skelton view showing another embodiment of the selecting shaft of the device of the present invention.
Figure 7:
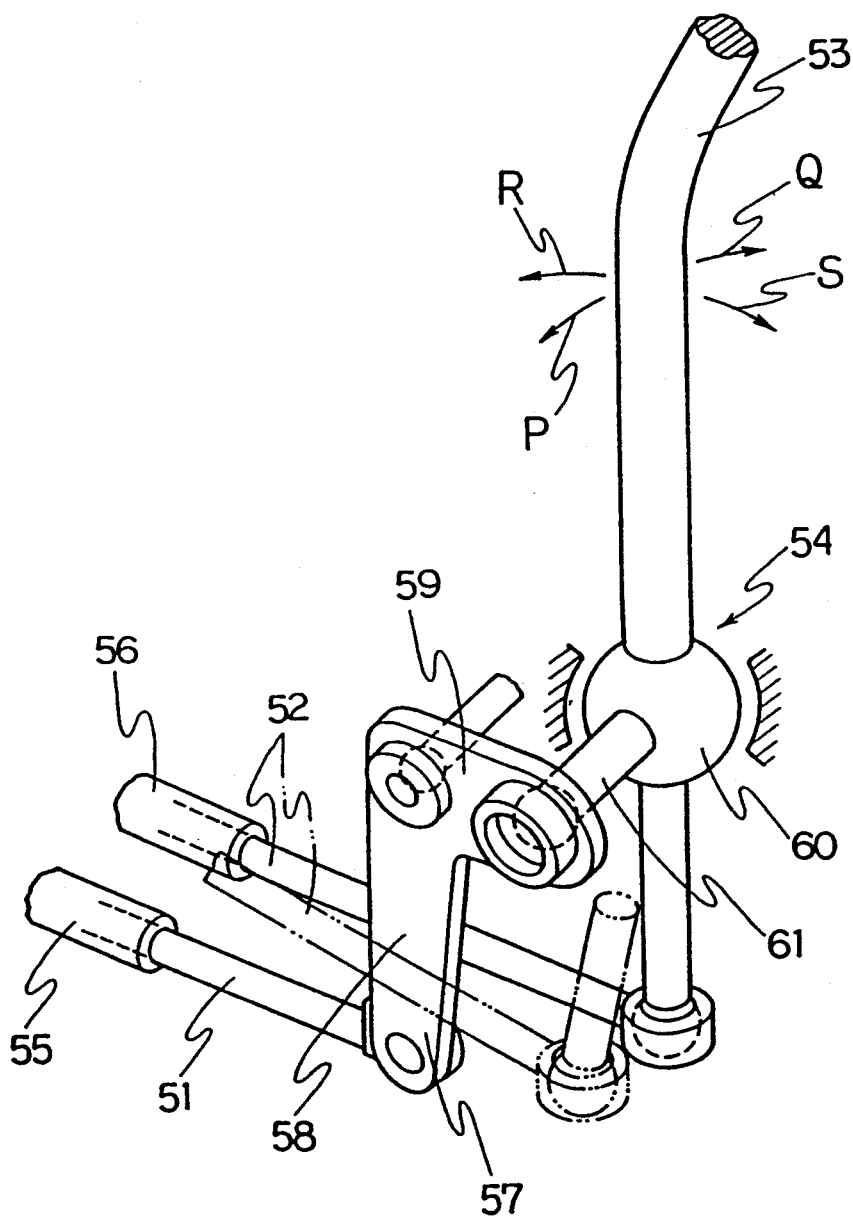
FIG. 7 is a perspective view showing a conventional transmission operating device.

Further, in the device shown in FIGS. 1 and 2, the first axis I CS-X axis is inclined to swing in the right or left direction (in the direction of arrow $S_1$ or arrow $S_2$ in FIG. 6) in the horizontal plane (a plane perpendicular to the vertical axis N (Z—Z axis in FIG. 6)). However, for instance, another direction which ascend in the fore part (arrow $S_3$) or descend in the fore part (arrow $S_4$) in the vertical plane including the fore-and-back axis L (Y—Y axis), can be employed. Further, such a direction that the directions both are combined each other, e.g. "$S_1+S_3$" or "$S_2+S_4$" can be employed.

In short, the first axis is merely required to have a component of the fore-and-back direction in order that a selecting operation can be performed, and any direction crossing with a plane perpendicular to the fore-and-back axis L (Y—Y axis) with certain angel can be employed, and even if the first axis might point in any direction, the same operation can be effected. Thus, the position of the first axis may be obtained by considering a right-and-left axis of the frame 1, such as the axis M, and rotating the right-and-left axis around a vertical axis such as the axis N to a position having a certain nagle relative to the right-and-left direction of the frame.

And besides, the connecting member, to which the selecting operation member is connected, is merely required to be located in a plane crossing with the fore-and-back axis L and to be crossed with the first axis. However, if the connecting member is located in a plane substantially perpendicular to the first axis and further in a plane crossing with the fore-and-back axis L with right angle, a component of the direction of the fore-and-back axis L becomes maximum in a selecting operation and therefore, the operation is effective.

And besides, in every case the second axis II should be parallel to the right-and-left axis M.

Furthermore, in the embodiment shown in FIGS. 1 and 2, the arm portion 28 of the change lever 24 is shifted from an intersection between the first axis and the second axis. However, the handle portion 29 and the arm portion 28 can be installed on a line including the intersection. In this case, there is an advantage that the movement in the alteral direction of the rod 16 due to the selecting operation can be minimised.

Further, in the embodiment shown in FIGS. 1 and 2, the shaft member is constructed so as to be of "y" like shape. However, a linear shape without having a branch portion can also be employed as a shaft member 19. In case of employing the linear shape, a selecting shaft which is provided with an axis at the center thereof so as to extend in the direction inclined to the longitudinal direction of the selecting shaft, or a ball joint of which rotational direction is restricted by means of a guide can be also employed.

In the embodiments shown in FIGS. 1 and 2, the selecting shaft is provided with the connecting member in the lower side thereof. However, the selecting shaft can be also provided with the connecting member in the upper side thereof. Furthermore, in the embodiment shown in FIG. 6, the connecting member can be projected in either the right or left direction.

Since in the device of the present invention the bell crank is not interposed, a construction is very simpel so that an appearance is compact and a production cost is low.

Though several embodiments of the invention are described above, it is to be understood that the present invention is not limited to the above-mentioned embodiments, and various changes and modifications may be made in the invention without departing from the spirit and scope thereof.

What is claimed is:

1. A transmission operating device comprising: (a) a frame; (b) a selecting operational member and a shifting operational member which are provided on said frame so as the extend in a fore-and-back direction of the frame, and are arranged substantially parallel to each other;
   (c) a selecting shaft supported on a back side of the frame so as to be rotatable around a first axis crossing obliquely with a plane perpendicular to an axis extending in the fore-and-back direction; said selecting shaft having a connecting member, which is a part thereof and is located in a plane crossing with the fore-and-back axis;
   (d) a change lever extending vertically and being connected with the selecting shaft so as to be rotatable around a second axis crossing with the first axis and extending in a right-and-left direction of the frame, said right-and-left direction being perpendicular to said fore-and-back direction
   (e) said selecting operational member having a free end connected with the connecting member; and
   (f) said shifting operational member having a free end rotatably connected with the change lever.

2. The device of claim 1, wherein the first axis is located on a position obtained by rotating a right-and-left axis of frame around a vertical axis of the frame with a certain angle.

3. The device of claim 1, wherein the first axis is located on a position obtained by rotating a fore-and-back axis of the frame around a right-and-left axis of the frame with a certain angle.

4. The device of claim 1, wherein the connecting member is disposed at substantially a right angle relative to the first axis and is located on a plane and disposed substantially at a right angle relative to a fore-and-back axis.

5. The device of claim 1, wherein each of the selecting operaiton member and the shifting operation member respectively comprises a guide pipe having an end connected to a fore side of the frame by means of a spherical joint, a rod having an end region slidably inserted into said pipe, 6. the device of claim 2, wherein the first axis is crossed with the second axis with an angle of 35 to 55 degrees.

7. The device of claim 6, wherein the first axis is crossed with the second axis substantially with an angle of 45 degrees.

* * * * *